Patented Sept. 8, 1936

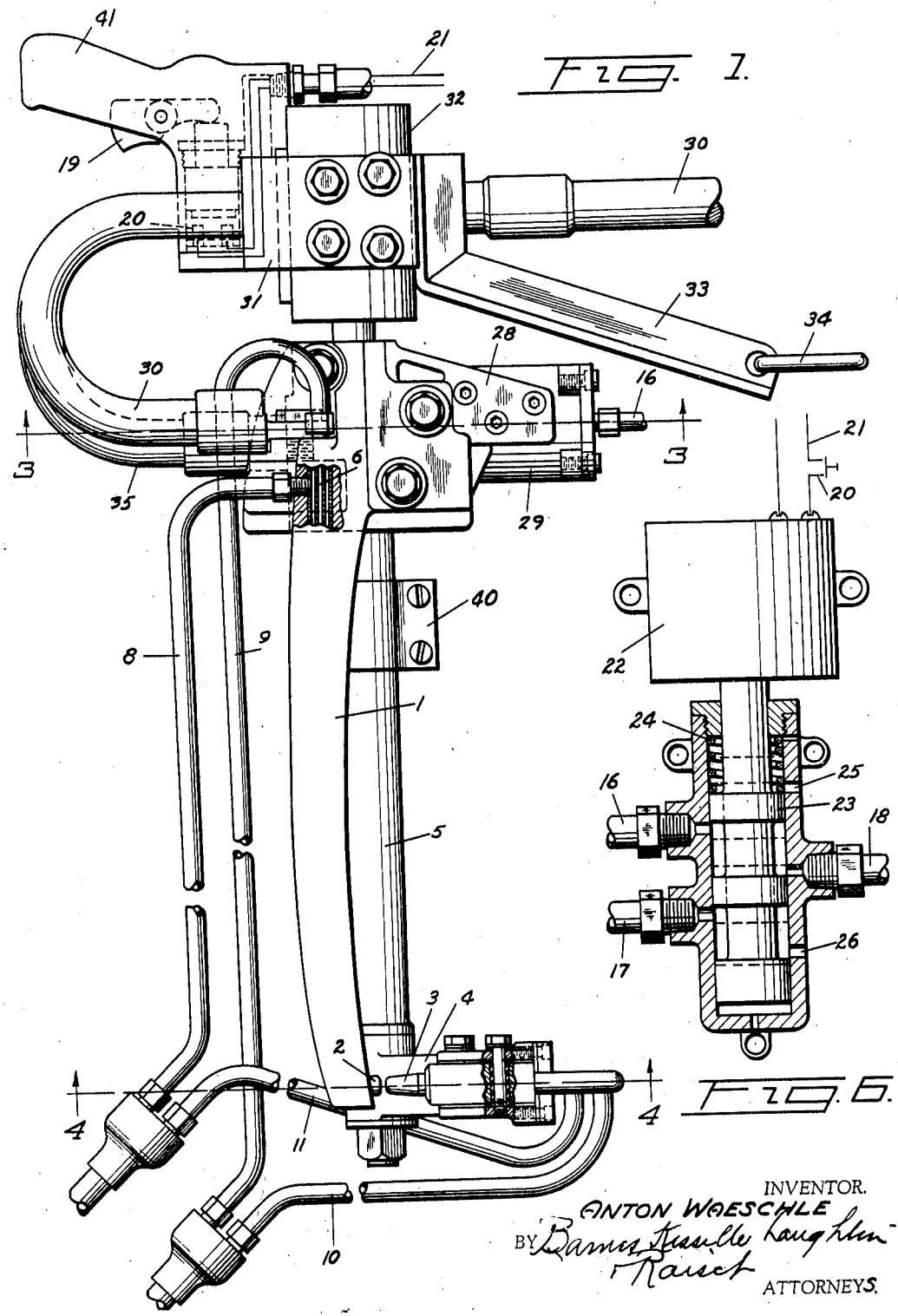

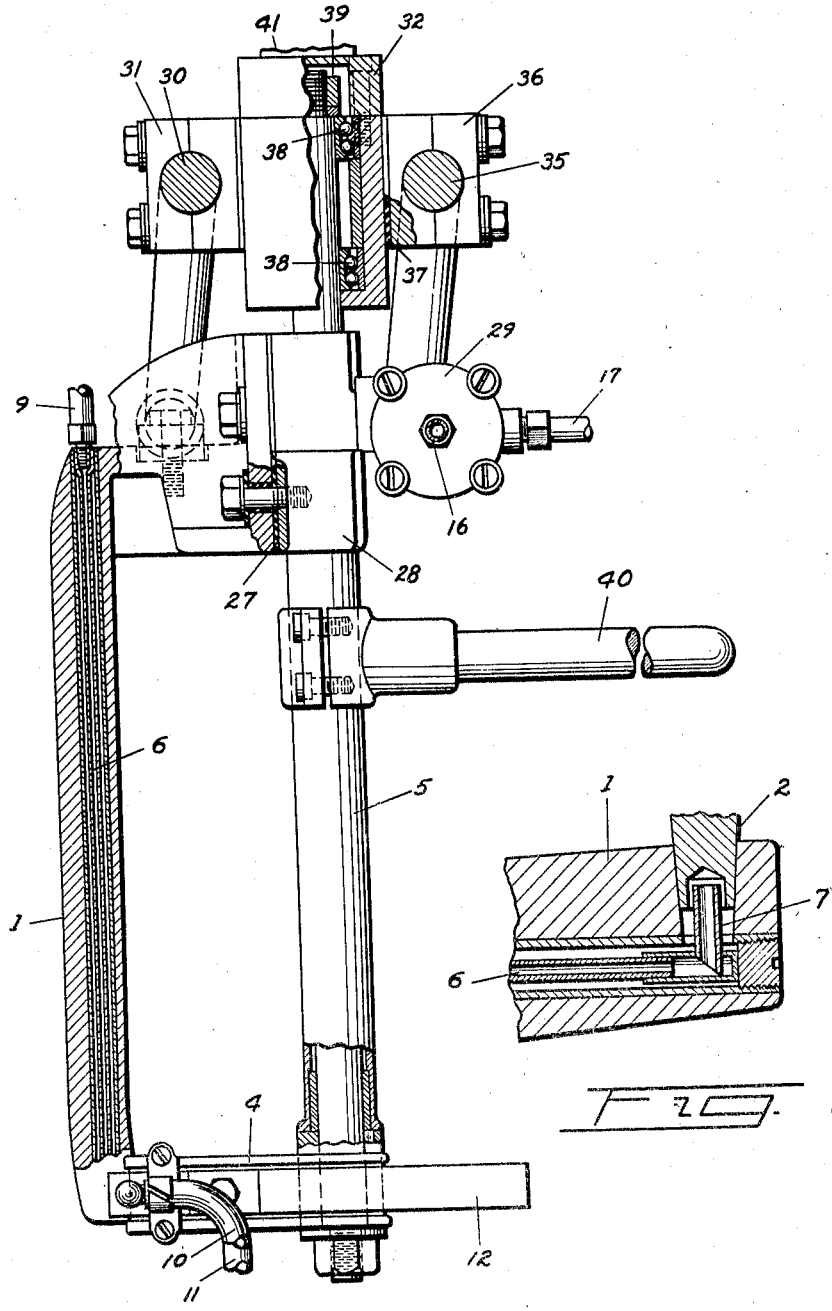

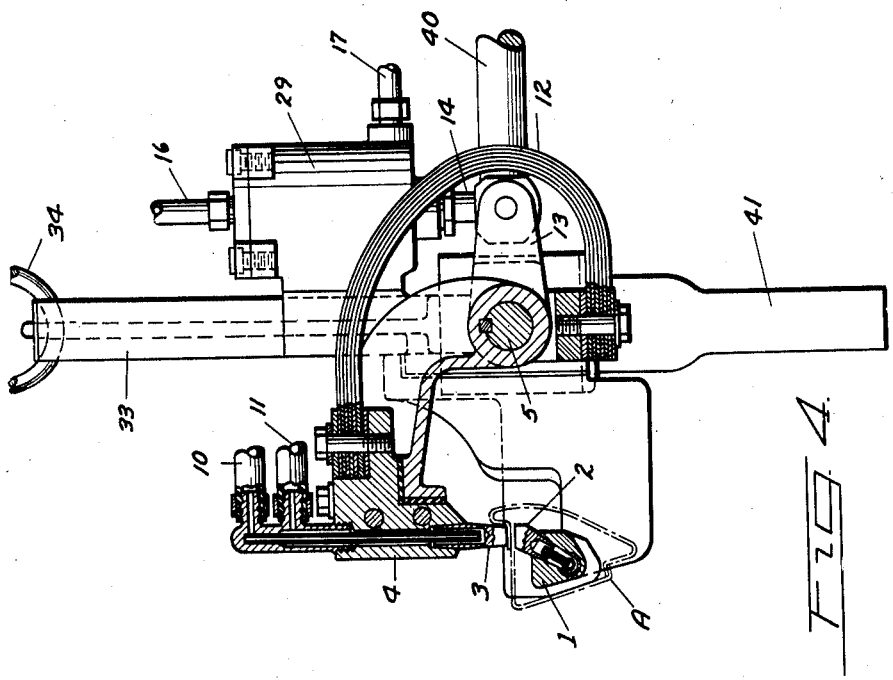
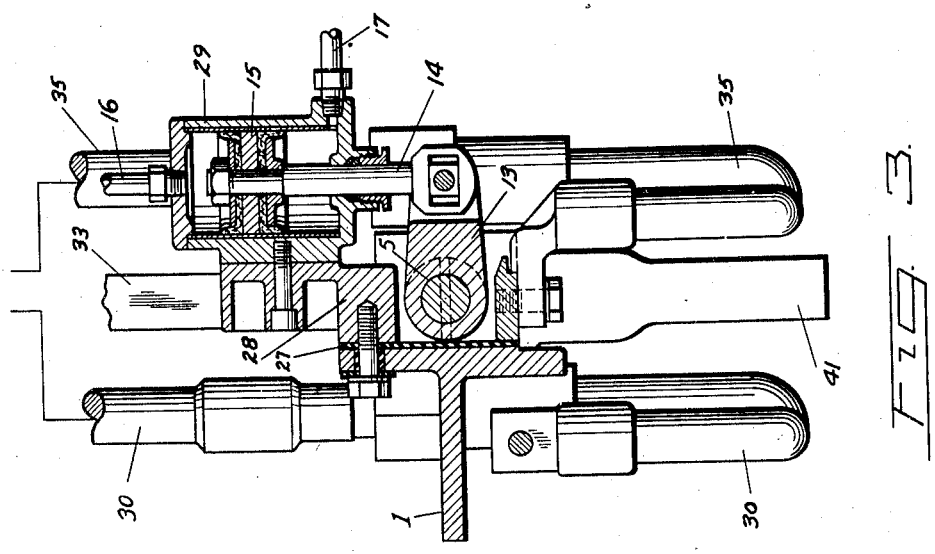

2,053,452

UNITED STATES PATENT OFFICE 2,053,452

PORTABLE WELDER

Anton Waeschle, Detroit, Mich., assignor to General Motors Corporation, Detroit, Mich., a corporation of Delaware Application October 28, 1935, Serial No. 46,974

9 Claims. (Cl. 219—4)

This invention relates to portable welders and it has for its object a tool that is capable of effectively welding in comparatively inaccessible places, for instance in the construction of metal closed bodies for automobiles the pillar cover has to be welded to the windshield frame. Inasmuch as these two parts make a hollow pillar which is completely enclosed, there is a real problem in welding by the usual way—spot welding, because no ordinary spot welder can be used. Arc welding or gas welding can be done from the exterior, but this would be altogether unsatisfactory for numerous reasons.

I have solved the problem by suspending a portable welder from the ceiling and providing it with a long, slim mandrel arm which can be slipped into the hollow pillar in the same way that a core would be slipped in. On the outside, I provide a rock shaft carrying a companion electrode that is adapted to rock with respect to the mandrel electrode which is on the inside of the hollow pillar. Fluid pressure is provided for controlling the rocking action.

Referring to the drawings:

Fig. 1 is an elevational view of the tool with some of the detail parts in section.

Fig. 2 is a view of the tool taken from the right of Fig. 1 and with some of the parts in section.

Figs. 3 and 4 are sections on the corresponding section lines of Fig. 1.

Fig. 5 is a detail of the water cooling of the mandrel electrode.

Fig. 6 is a detail of the air valve controlled by the electric current.

I designates a mandrel which is long and slim and which can be threaded down into the hollow pillar A when the pillar cover and windshield frame of a metal closed body are brought together. It is provided with a mandrel or stationary electrode 2 and a companion or movable electrode 3 which is carried on a rocking head 4 that in turn is fastened to the rock shaft 5. Water passes down through the mandrel, through a pipe 6 and thence by an elbow 7 into the very base of the electrode 2. It returns on the outside of this pipe through the return hose 8. 9 is the supply hose. Likewise, water passes to the electrode 3 from the supply hose 10, passes into the base of the electrode, then back on the outside of the supply pipe to the return hose 11.

Now if one will give attention to Fig. 4, he will see how the tool is designed to work. In dotted lines is shown the section of the hollow windshield pillar, sometimes called the A pillar.

On the inside is threaded the mandrel arm of the spot welder. On the outside is the rocking arm or head 4 which is provided with high amperage, low voltage current by the large laminated conductor 12. This arm is keyed to the rock shaft 5 which, in turn, is provided with the crank arm 13 which is actuated by the piston rod 14 driven by the fluid piston 15 by letting fluid pressure through the pipe 16 behind the piston. In this way, the electrodes can be opened and likewise by letting fluid pressure enter in front of the piston through the supply pipe 17, the electrodes can be closed.

Referring to Fig. 6, it will be seen that the air can enter through the pipe 18 and be delivered to the top of the air cylinder through the conduit 16. This is the normal open position. Now, when the trigger 19 is pressed, the switch points 20 are bridged, the circuit 21 is energized, energizing the solenoid 22 and lifting the piston valve 23 against the efforts of the spring 24. This, it will be seen, connects the air supply 18 with the air conduit 17 and closes the electrodes. At the same time, it exhausts the air behind the piston through the port 25. When the trigger is released, the spring returns the valve and then allows the air in front of the piston to exhaust through the port 26.

The timing is not shown. This can be controlled in any desirable way, for instance the air pressure when the trigger is pressed may operate a switch in the primary circuit and electrical apparatus be used to measure the current flow, or the air pressure may operate not only a switch in the primary but complete the timing. These are now all known devices and need not be here described as they are no part of the invention.

The mandrel or the stationary electrode arm I is bolted, with suitable insulation 27 intervening, to the tool head 28 which carries the fluid cylinder 29. One electric cable 30 connects with the arm I and passes through the clamp 31 on the cradle 32 from which the two arms are suspended. The cradle has an arm 33 and a bail 34 by which it may be suspended from the ceiling as by a cable or chain running over a sheave (not shown). The other electric cable 35 passes through the clamp 36 on the opposite side of the cradle. This clamp is insulated from the main part of the cradle by the insulation 37. The rock shaft 5 that carries the movable electrode is journalled by ball bearings 38 in the cradle. A nut 39 holds the shaft within the cradle. 40 is a handle clamped to the shaft by which the tool may be manipulated in conjunction with the handle 41 which is part of the cradle.

The operator or operators grasp the tool by the handles 40 and 41, bring it above the top of the hollow A pillar and thread the mandrel down through the pillar. The electrodes are open. When the tool has gotten down as far as the mandrel and its electrode will reach or as is desired, the trigger 19 is operated to force the electrodes together, the current comes on momentarily, the trigger is released, the air exhausts behind the piston, the tool is raised slightly and the same welding operation repeated each time as the tool is raised step by step out of the pillar. All of this work can conceivably be done by lifting and manipulating the tool by hand. Preferably, however, the tool is supported from the ceiling or from a stand by means of a cable running over a sheave, the opposite end being attached to a counter-balancing weight. This relieves the operator of the weight of the tool, the cable and the water connections which otherwise would be almost unbearable.

What I claim is:

1. Welding apparatus for welding in inaccessible places, comprising a tool having a mandrel arm with an electrode at substantially a right angle to the axis of the mandrel and adapted to reach down on the inside of the work and a second rocking arm adapted to straddle the outside of the work having an electrode substantially perpendicular to the arm and adapted to rock into contact with the work and the mandrel electrode, said rocking being in a plane substantially perpendicular to the axis of the mandrel.

2. Welding apparatus for welding in inaccessible places, comprising a tool having a mandrel arm with an electrode at substantially a right angle to the axis of the mandrel and adapted to reach down on the inside of the work and a second rocking arm adapted to straddle the outside of the work having an electrode substantially perpendicular to the arm and adapted to rock into contact with the work and the mandrel electrode, said rocking being in a plane substantially perpendicular to the axis of the mandrel, and means for rocking the rocking electrode into contact with the work and the stationary electrode.

3. Welding apparatus for welding in inaccessible places, comprising a tool having a mandrel arm with an electrode adapted to reach down on the inside of the work and a second rocking arm adapted to straddle the outside of the work having an electrode adapted to rock into contact with the work and the mandrel electrode, said rocking being in a plane substantially perpendicular to the axis of the mandrel, and fluid controlled means for rocking the rocking electrode into contact with the work and the stationary electrode.

4. A welding tool for the purpose described comprising a long, narrow mandrel with a laterally projecting electrode adapted to reach down in the interior of the work, a rock shaft supported to rock with respect to the mandrel in a plane substantially perpendicular to the axis of the mandrel, said shaft carrying a head with a laterally projecting electrode adapted to contact the exterior of the work opposite the mandrel electrode.

5. A welding tool for the purpose described comprising a long, narrow mandrel with a laterally projecting electrode adapted to reach down in the interior of the work, a rock shaft supported to rock with respect to the mandrel in a plane substantially perpendicular to the axis of the mandrel, said shaft carrying a head with a laterally projecting electrode adapted to contact the exterior of the work opposite the mandrel electrode and power means for rocking the rock shaft and its electrode into contact with the work and the stationary electrode.

6. A welding tool for the purpose described comprising a long, narrow mandrel with a laterally projecting electrode adapted to reach down in the interior of the work, a rock shaft supported to rock with respect to the mandrel in a plane substantially perpendicular to the axis of the mandrel, said shaft carrying a head with a laterally projecting electrode adapted to contact the exterior of the work opposite the mandrel electrode and fluid controlled piston and cylinder for rocking the shaft to bring the movable electrode into contact with the work opposite the stationary electrode on the inside.

7. A welding tool for the purpose described comprising a long, narrow mandrel with a laterally projecting electrode adapted to reach down in the interior of the work, a rock shaft supported to rock with respect to the mandrel, carrying a head with a laterally projecting electrode adapted to contact the exterior of the work opposite the mandrel electrode and a cradle for rotatably suspending the rock shaft.

8. A welding tool for the purpose described comprising a long, narrow mandrel with a laterally projecting electrode adapted to reach down in the interior of the work, a rock shaft supported to rock with respect to the mandrel, carrying a head with a laterally projecting electrode adapted to contact the exterior of the work opposite the mandrel electrode and a cradle provided with anti-friction bearings for rotatably supporting the rock shaft.

9. A welding tool for the purpose described comprising a long, narrow mandrel with a laterally projecting electrode adapted to reach down in the interior of the work, a rock shaft supported to rock with respect to the mandrel, carrying a head with a laterally projecting electrode adapted to contact the exterior of the work opposite the mandrel electrode, a cradle for rotatably suspending the rock shaft and for also suspending the power cables, the said power cables one passing through the cradle and connected with the mandrel and the other passing through and supported by the cradle and connected with the rock shaft.

ANTON WAESCHLE.